United States Patent [19]

Nemeth

[11] Patent Number: 5,317,898

[45] Date of Patent: Jun. 7, 1994

[54] METHOD AND APPARATUS FOR DETECTING THICKNESS VARIATION IN SHEET MATERIAL

[75] Inventor: Karoly G. Nemeth, Don Mills, Canada

[73] Assignee: Scantech Electronics Inc., Mississauga, Canada

[21] Appl. No.: 989,577

[22] Filed: Dec. 11, 1992

[51] Int. Cl.⁵ .................................. G01B 13/04
[52] U.S. Cl. ............................. 73/37.7; 73/37
[58] Field of Search .......... 73/37.7, 37.6, 37.5, 73/73; 33/DIG. 2

[56] References Cited

U.S. PATENT DOCUMENTS

| | | | |
|---|---|---|---|
| 2,276,036 | 3/1942 | Hanna et al. | 73/37.7 |
| 2,707,389 | 5/1955 | Fortier | 73/37.5 |
| 3,495,442 | 2/1970 | Rejsa | 73/37.6 |
| 3,499,312 | 3/1970 | Eickenhorst | 73/37.5 |
| 3,513,688 | 5/1970 | Thibault | 73/37.9 |
| 4,348,889 | 9/1982 | Haynes et al. | 73/37.7 |
| 4,391,127 | 7/1983 | Hawkins | 73/37.7 |
| 4,458,519 | 7/1984 | Day et al. | 73/37 |
| 4,550,592 | 11/1985 | Dechape | 73/37.5 |
| 4,581,918 | 4/1986 | Duhrin | 73/37.7 |
| 4,912,410 | 3/1990 | Morley | 73/37.6 |
| 4,953,388 | 9/1990 | Barada | 73/37.5 |

Primary Examiner—Hezron E. Williams
Assistant Examiner—Valerie Francies
Attorney, Agent, or Firm—Shoemaker and Mattare, LTD

[57] ABSTRACT

The detection of thickness variations in sheet material, more specifically the presence or absence of labels on a moving web, is accomplished by providing two spaced apart nozzles, an entry for pressurized fluid, first and second conduits to connect the entry and the nozzles, and a differential pressure sensing element connected between the conduits so as to detect a mismatch between the fluid pressures in the two conduits.

7 Claims, 3 Drawing Sheets

METHOD AND APPARATUS FOR DETECTING THICKNESS VARIATION IN SHEET MATERIAL

This invention relates to sensing devices for detecting variations in the thickness of sheet materials, and has to do particularly with a method and apparatus for sensing the presence or absence of pressure sensitive labels on a linearly travelling continuous strip of carrier substrate (web) material.

BACKGROUND OF THIS INVENTION

In the printing industry, labels which are carried on an underlying web or carrier substrate usually are spaced apart with gaps between them. Such labels are typically detected using optical sensing devices. These sensors are configured to operate in the transmission ("see-through") mode, detecting the difference in optical density between the backing material (substrate) and the backing plus the label. Alternatively, in the reflecting mode, the sensor detects printed features on the labels.

Recently, transparent materials have become common for labelling applications, as well as for the substrate material. If both the substrate and the label are transparent, optical sensors tend not to be suitable, since it is difficult to detect minute differences in the optical properties of substantially transparent materials. Fluorescent adhesive materials between the label and the carrier have been used occasionally to help differentiate optically between the label and the backing material.

In the past, surface features of a travelling web have been detected utilizing a single nozzle with a pressure sensing device positioned in the air flow path to the nozzle. As the distance between the nozzle outlet and the surface changes, the pressure and the corresponding sensor output signal changes more or less with the reciprocal function of the distance. In this prior approach, the output signal of the sensor is a function of the absolute distance of the nozzle to the surface, as well as the supply pressure. In conventional arrangements of nozzle and sensor, the response time of the system places a limit on the speed at which sheet material with small surface features can be moved past the nozzle.

Another approach has utilized contact rollers pressed against the surface, in conjunction with displacement-sensing devices, to detect the presence of the labels. This method has limitations in speed, vibration interference and spatial resolution.

PRIOR ART

The following patents are of interest:

U.S. Pat. No. 4,391,127, issued on Jul. 5, 1983 to William E. Hawkins.

The invention set forth in this patent relates to the detection of breaks or a slack condition in a continuous web. Air is forced under pressure through an inlet and eventually around a flared end of a vacuum tube. So long as the web is located in close proximity to the flared end, the air rushing around the flared end rebounds from the web and maintains a relatively high pressure in the tube. If the web is absent, the pattern of air around the flared end is such as to cause a pressure drop in the tube, which is detected by suitable means. In the description it is admitted that a significant change is required in the distance from the sensor head to the web in order to create detectable "suction". It is expected that the required sensitivity to minute distance variations on the order of 0.002 to 0.006 inches (the typical thickness of a label) would not be achieved. Furthermore, the magnitude of the resultant effect in the vacuum tube ("suction" or negative pressure) will be dependent upon the supply pressure as well as on the absolute distance to the web. These "parasitic" effects will tend to limit the useful sensitivity of the arrangement. Finally, the remote location of the pressure switch tends to limit the speed with which the pressure changes can be detected.

U.S. Pat. No. 4,458,519, issued Jul. 10, 1984 to Day et al.

This patent discloses an apparatus which includes a probe with an orifice opened or closed by the absence or presence of a surface in contact with the probe. A pressure sensor indicates whether or not the probe is in contact with the surface. For the intended operation, the contact face must be mounted such that it can follow the contour of a surface. When detecting the presence or absence of labels, physical contact with the web/label combination is undesirable, as it limits the possible sensing speed.

U.S. Pat. No. 4,581,918, issued Apr. 15, 1986 to Lief Duhrin.

In this arrangement, object thickness variation is measured using pneumatically operated gauging heads. The heads are on opposite sides of the object to be measured, and only one of them is connected to a transducer. This arrangement tends to lose the potential for compensating parasitic unwanted effects, since differential measurement is not possible. The transducer detects the physical movement of the movable portion of the gauge head as it follows the contour of the surface. Such movement is a limiting factor on the speed of response to small surface features, and friction may create hysteresis in detection.

GENERAL DESCRIPTION OF THIS INVENTION

In view of the foregoing, it is an object of one aspect of this invention to provide a novel construction for an apparatus for detecting thickness variations in sheet material, and more particularly to detect the presence or absence of a label on a moving web, utilizing a single differential pressure sensing element and spaced-apart, connected nozzles supplied with pressurized fluid, with the nozzles placed in close proximity with the label surface. It is an object of another aspect of this invention to provide an apparatus for detecting thickness variations in sheet material which is capable of detecting small thickness differences and can be adapted to high speed operation.

More particularly, this invention provides an apparatus for detecting thickness variations in sheet material the sheet material being the combination of a continuous substrate and spaced-apart labels adhered to the substrate with gaps between the labels, the apparatus, comprising:

a first nozzle and a second nozzle, support means supporting the nozzles in spaced apart relation, an entry for pressurized fluid, a first conduit interconnecting the entry and the first nozzle, a second conduit interconnecting the entry and the second nozzle, a fixed support surface over which a piece of said sheet material can be moved, the nozzles having downstream ends that are spaced substantially equidistant from said support surface, and a differential pressure sensing element connected between said conduits so as to detect a mismatch between the fluid pressures in the two conduits said nozzles being spaced apart by a distance which is less than the spacing between the gaps.

Moreover, this invention provides a method for detecting thickness variations in sheet material said sheet material comprising a web supporting a plurality of spaced-apart labels with gaps between the labels, the method including the steps:

a) providing an apparatus comprising a first nozzle and a second nozzle, support means supporting the nozzles in spaced apart relation, an entry for pressurized fluid, a first conduit interconnecting the entry and the first nozzle, a second conduit interconnecting the entry and the second nozzle, and a differential pressure sensing element connected between said conduits so as to provide a signal whenever it detects a pressure difference in the conduits which is greater than a predetermined amount, b) mounting the apparatus above a fixed support surface such that the nozzles are directed toward the surface but are spaced substantially equidistant therefrom, the sheet material being a substate carrying spaced-apart labels c) passing the sheet material between the surface and the nozzles while supplying pressurized fluid to said entry, and d) monitoring the signals provided by said element.

Finally, this invention provides a method for detecting surface irregularities in sheet material the sheet material being a substrate carrying spaced-apart labels, the method including the steps:

a) providing pressurized fluid to two nozzles which have a center-to-center distance that is less than the center-to-center distance between adjacent labels, b) moving the sheet material under the nozzles in close proximity thereto while maintaining the nozzles in a fixed relation spaced apart in the direction of movement of the sheet material, c) and continuously comparing the fluid pressure upstream of one nozzle with the fluid pressure upstream of the other.

BRIEF DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
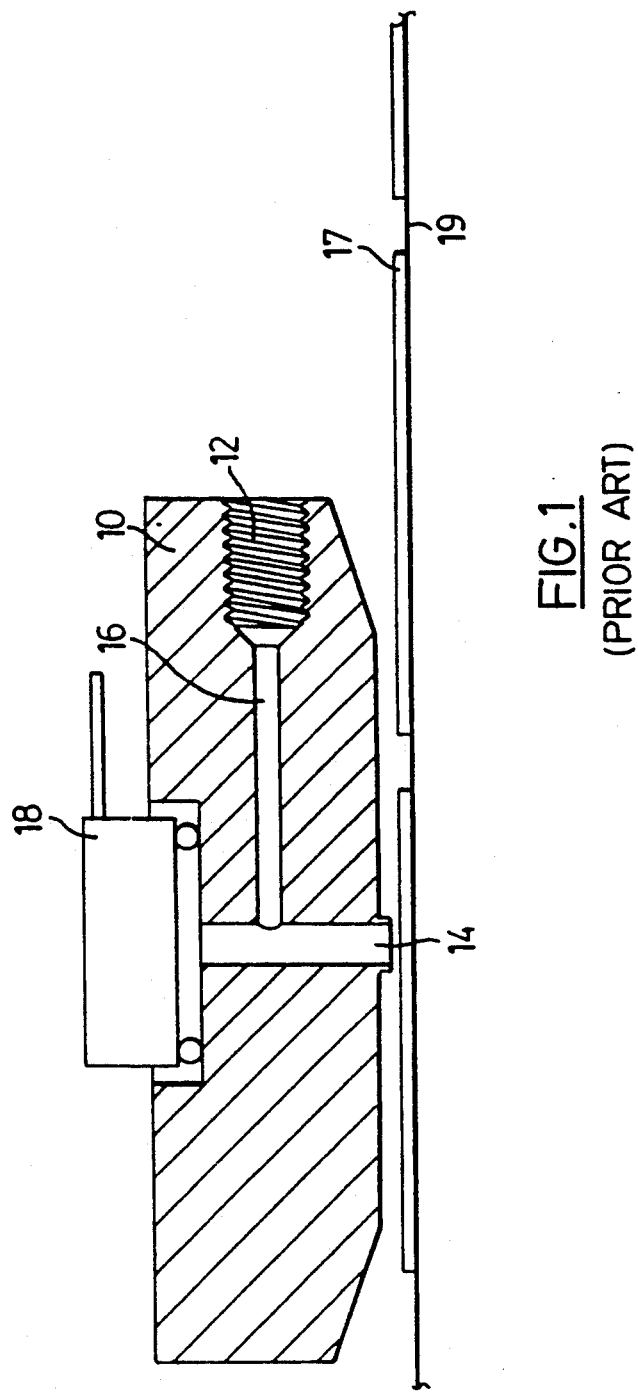
FIG. 1 is a schematic side elevation of a prior art sensor.

The prior art arrangement shown in FIG. 1 includes a main body 10, having an air supply opening 12, a downwardly protruding nozzle 14, a conduit 16 between the opening 12 and the nozzle 14, and a pressure sensor 18 in communication with the upper end of the nozzle 14. The nozzle 14 is positioned adjacent a moving substrate or web 19 which carries a plurality of spaced apart labels 17.

As previously mentioned, in this arrangement the resultant pressure signal will be dependent upon the supply pressure as well as on the absolute distance between the nozzle and the web, and therefore the sensitivity to small variations in thickness tends to be limited.

Figure 2:
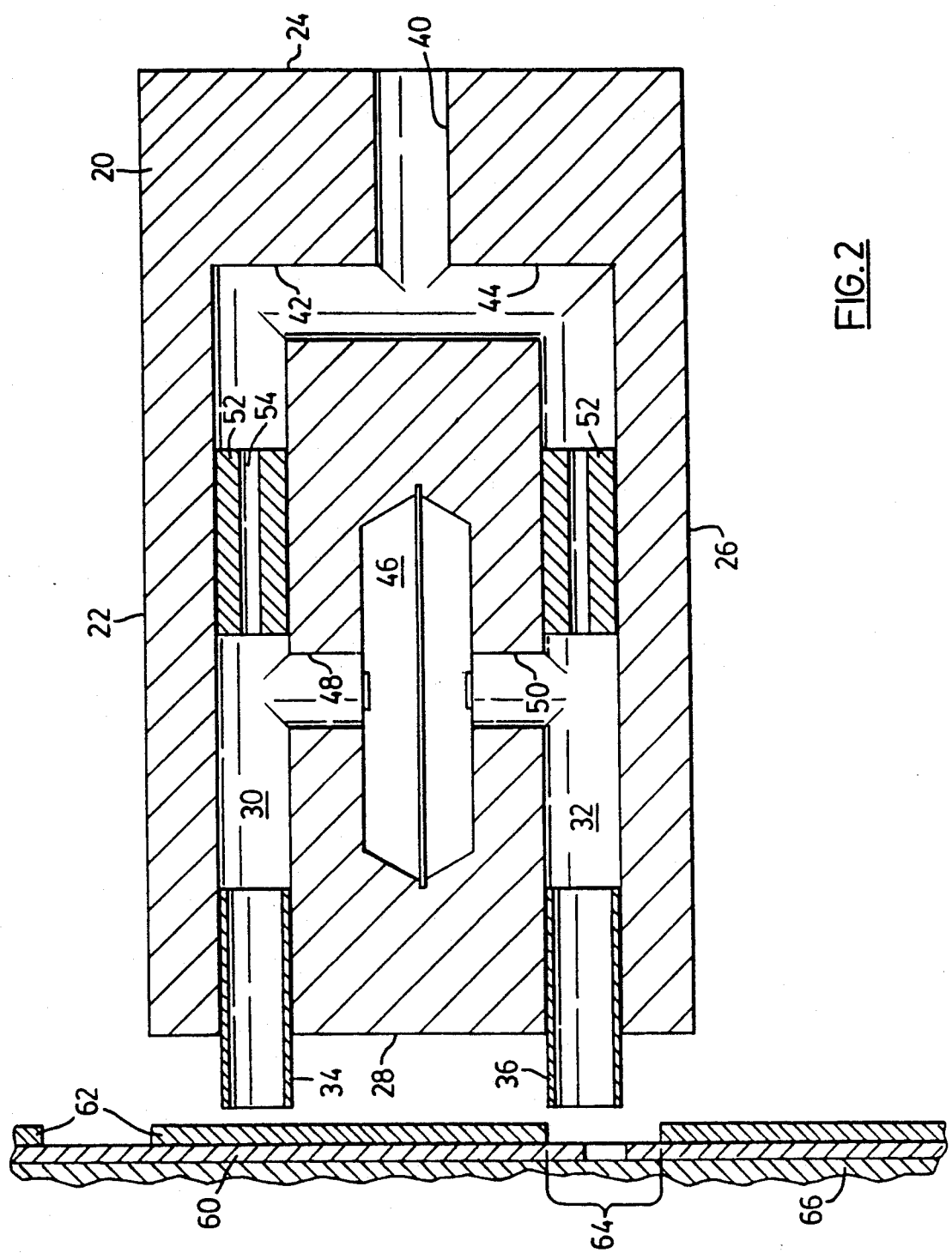
FIG. 2 is a sectional view through an apparatus constructed in accordance with the present invention.

Attention is now directed to FIG. 2, which shows a main body 20, typically in the shape of a rectangular parallelepiped. The body 20, as seen in section in FIG. 2, has four edges 22, 24, 26 and 28, and is bored from the surface 28 to provide two internal parallel passages 30 and 32. Two nozzles 34 and 36 are firmly lodged within the passages 30 and 32 respectively, and project leftwardly from the surface 28.

Bored into the rightward end of the body 20 is a supply port 40 constituting an entry for pressurized fluid. The port 40 is connected by way of two branches 42 and 44 with the inner ends of the passages 30 and 32.

Thus it will be seen that the body 20 not only constitutes support means supporting the nozzles 34 and 36 in spaced-apart relation, but also provides equal-length passageways from the supply port 40 to the nozzles 34 and 36.

Located-equidistantly between the passages 30 and 32 is a differential pressure sensing element 46, which communicates with the passages 30 and 32 through equal-length conduits 48 and 50.

If necessary, a passage-restricting element in the form of a cylindrical insert 52 with a restricted internal bore 54 can be placed in each passage 30, 32 at locations that do not interfere with the communication between the sensing element 46 and the two nozzles 34 and 36. The purpose of the passage-restricting inserts 52 is to increase the sensitivity of the apparatus, by slowing down the rate at which pressurized air (or other fluid) from the supply 40 can move to the vicinity of the nozzles 34 and 36 in order to supply pressurized air that is lost when the nozzle arrives at a gap between labels.

At the left in FIG. 2, a substrate 60 carries a plurality of labels 62 that are separated by the typical gaps 64. At lower left in FIG. 2, it can be seen that the substrate (web) 60 travels over a fixed support surface 66. In the illustrated embodiment, the axis-to-axis distance separating the nozzles 34 and 36 is less than the distance separating the gaps 64.

Figure 3:
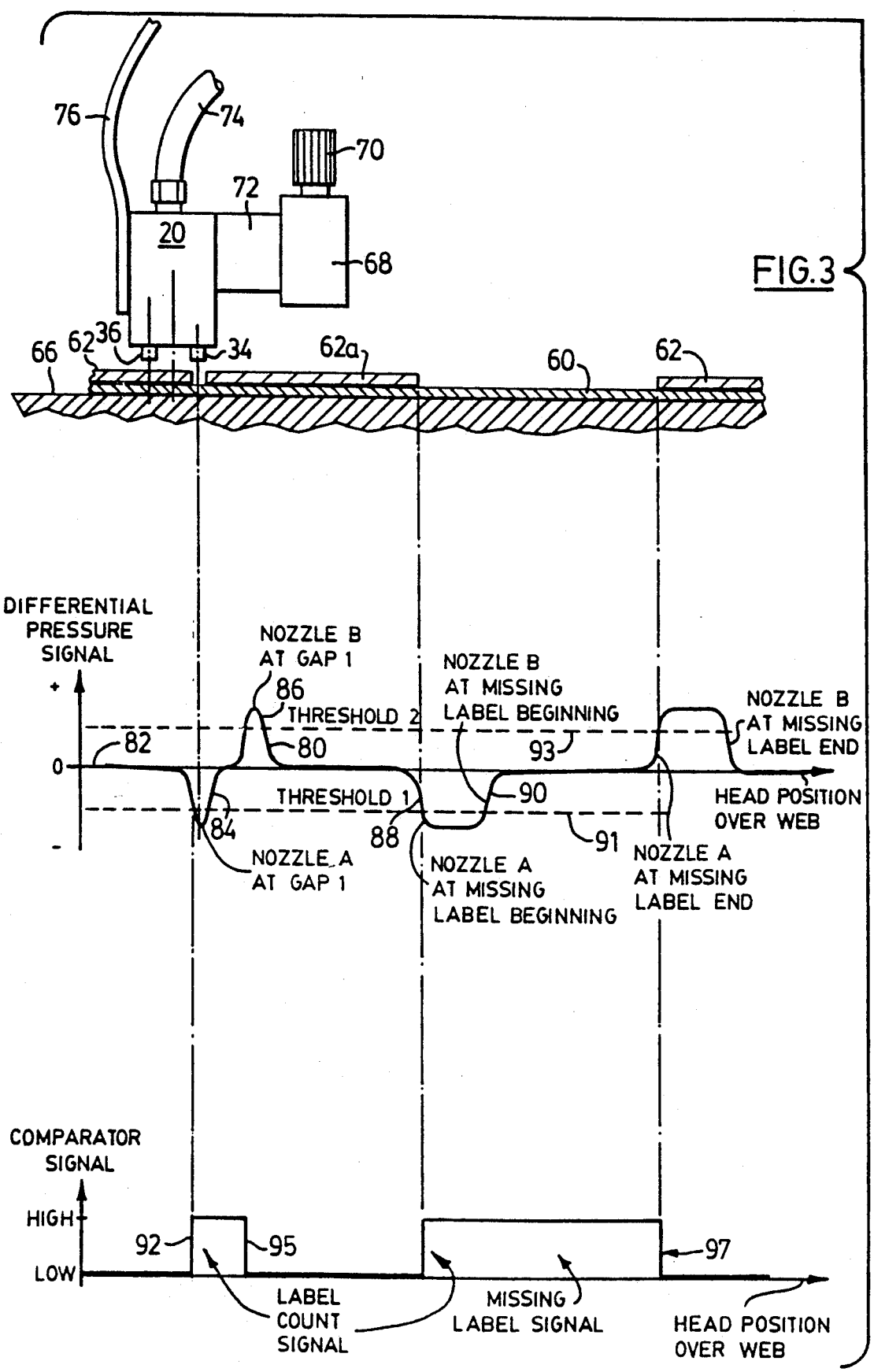
FIG. 3 shows an elevation of the apparatus of the present invention, along with graphical representations of the actual differential pressure detected along a moving web and the comparator signal generated by the differential pressure signal.

Attention is now directed to FIG. 3, which at the top illustrates a support mechanism 68 suspended from a vertical position adjustment device 70, and supporting an arm 72 which firmly holds the body 20 in place such that the nozzles 34 and 36 are held in spaced-apart relation at a predetermined distance away from the support surface 66.

FIG. 3 also shows a tube 74 along which pressurized air can be supplied to the port 40 (FIG. 2), as well as a sensor signal cable 76 which carries signals from the differential pressure sensing element 46 (FIG. 2).

In FIG. 3, the substrate 60 is shown with a plurality of labels 62, one of which is missing. It is to be understood that the substrate 60 is moving from right to left under the nozzles 34 and 36, which is effectively the same thing as holding the substrate stationary and moving the body 20 from left to right. The graphical representations toward the bottom of FIG. 3 are drawn as if the body 20 were moving above a stationary web.

The graph line 80 represents the differential pressure as it changes positively or negatively with respect to a neutral line 82 which represents the condition of equal pressure in both passages 30 and 32. The "tracer" for the graph line 80 is taken to be coincident with the axis of nozzle 34.

Tracing the graph line 80 from the leftward limit, it will be seen that, when both nozzles 34 and 36 are located above the same label, the pressure sensing element does not detect any difference, and therefore the pressure remains at 0. As the rightward nozzle 34 hits the first gap between labels (the situation drawn at the top of FIG. 3), the pressure sensing element notes a negative pressure which is represented in FIG. 3 by the narrow downward spike 84. When the nozzle 34 moves rightwardly over the left edge of the next label (62a), the pressure again returns to neutral until the leftward nozzle 36 arrives at the same gap. This produces the positive spike 86. The apparatus next comes upon the location where an entire label is missing. As the rightward nozzle 34 becomes coincident with the beginning of the place where the label is missing, a negative pressure is noted, as indicated at 88. Since the label is missing, the negative pressure persists until the second nozzle 36 reaches over the place where the label is missing. The signal then returns along line 90 to the neutral condition. A similar occurrence takes place after the nozzles 34 and 36 have traversed the location where the label is missing and are again both above the next label.

In FIG. 3, the broken line 91 represents the threshold at which a negative air spike triggers a count signal (goes "high") as represented by the vertical line 92 at bottom left in FIG. 3. The broken line 93 represents the threshold at which a positive pressure differential returns the signal from "high" to "low" along the line 95. It will be seen that the missing label signal shown generally at 97 is much longer than the signal generated at a standard gap with no labels missing.

The logic to which the signal cable 76 is connected can easily be programmed to generate a warning or alarm when a signal of the shape of that shown at 97 is detected.

While one embodiment of this invention has been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. An apparatus for detecting thickness variations in sheet material, the sheet material being the combination of a continuous substrate and spaced-apart labels adhered to the substrate with gaps between the labels, the apparatus comprising:
    a first nozzle and a second nozzle,
    support means supporting the nozzles in spaced apart relation,
    an entry for pressurized fluid,
    a first conduit interconnecting the entry and the first nozzle,
    a second conduit interconnecting the entry and the second nozzle,
    a fixed support surface over which a piece of said sheet material can be moved, the nozzles having downstream ends that are spaced substantially equidistant from said support surface, and
    a differential pressure sensing element connected between said conduits so as to detect a mismatch between the fluid pressures in the two conduits, said nozzles being spaced apart by a distance which is less than the spacing between the gaps.

2. The apparatus claimed in claim 1, in which the nozzles are parallel.

3. The apparatus claimed in claim 1, in which the conduits include passage-restricting means to increase the sensitivity of the apparatus.

4. A method for detecting thickness variations in sheet material, said sheet material comprising a web supporting a plurality of spaced-apart labels with gaps between the labels, the method including the steps:
    a) providing an apparatus comprising a first nozzle and a second nozzle, support means supporting the nozzles in spaced apart relation, an entry for pressurized fluid, a first conduit interconnecting the entry and the first nozzle, a second conduit interconnecting the entry and the second nozzle, and a differential pressure sensing element connected between said conduits so as to provide a signal whenever it detects a pressure difference in the conduits which is greater than a predetermined amount,
    b) mounting the apparatus above a fixed support surface such that the nozzles are directed toward the surface but are spaced substantially equidistant therefrom, and such that the nozzles are spaced apart by a distance which is less than the spacing between the gaps,
    c) passing the sheet material between the surface and the nozzles while supplying pressurized fluid to said entry, and
    d) monitoring the signals provided by said element.

5. The method claimed in claim 4, in which the element provides a first type of signal when the pressure in the first conduit exceeds that in the second, and a second type of signal when the pressure in the second conduit exceeds that in the first.

6. The method claimed in claim 4, which includes restricting an effective bore of at least a part of each conduit upstream of the element, thereby increasing the sensitivity of the method.

7. A method for detecting surface irregularities in sheet material, the sheet material being a substrate carrying spaced-apart labels, the method including the steps:
    a) providing pressurized fluid to two nozzles which have a center-to-center distance that is less than the center-to-center distance between adjacent labels,
    b) moving the sheet material under the nozzles in close proximity thereto while maintaining the nozzles in a fixed relation spaced apart in the direction of movement of the sheet material,
    c) and continuously comparing the fluid pressure upstream of one nozzle with the fluid pressure upstream of the other.

* * * * *